United States Patent
Eckert

(10) Patent No.: US 12,169,625 B2
(45) Date of Patent: Dec. 17, 2024

(54) SYSTEMS AND METHODS FOR TRIGGERING AN INTERACTIVE LEARNING CONTEXT VIA DEEP LINKING

(71) Applicant: Linearity GmbH, Karlsruhe (DE)

(72) Inventor: Sam Raven Oliver Eckert, Berlin (DE)

(73) Assignee: Linearity GmbH, Berlin (DE)

( * ) Notice: Subject to any disclaimer, the term of this patent is extended or adjusted under 35 U.S.C. 154(b) by 0 days.

(21) Appl. No.: 17/663,773

(22) Filed: May 17, 2022

(65) Prior Publication Data
US 2023/0376183 A1    Nov. 23, 2023

(51) Int. Cl.
G06F 3/04842    (2022.01)
G06F 3/0488    (2022.01)
G06F 9/451    (2018.01)

(52) U.S. Cl.
CPC ........ *G06F 3/04842* (2013.01); *G06F 3/0488* (2013.01); *G06F 9/453* (2018.02)

(58) Field of Classification Search
CPC ..... G06F 3/04842; G06F 3/0488; G06F 9/453
See application file for complete search history.

(56) References Cited

U.S. PATENT DOCUMENTS

| | | | | |
|---|---|---|---|---|
| 10,489,946 | B1 * | 11/2019 | Batra | G06T 11/001 |
| 10,496,695 | B2 * | 12/2019 | Lahmann | G06V 30/1988 |
| 10,818,058 | B1 * | 10/2020 | Gupta | G11B 27/031 |
| 2011/0066970 | A1 * | 3/2011 | Burrier | G06F 3/0484 |
| | | | | 715/802 |
| 2012/0115122 | A1 * | 5/2012 | Bruce | G06F 9/453 |
| | | | | 434/323 |
| 2015/0278740 | A1 * | 10/2015 | Kennerly | G09B 19/24 |
| | | | | 705/7.26 |
| 2019/0295439 | A1 * | 9/2019 | Odell | G06F 3/0484 |
| 2022/0208229 | A1 * | 6/2022 | Danila | G11B 27/34 |

* cited by examiner

*Primary Examiner* — Angie Badawi
(74) *Attorney, Agent, or Firm* — Womble Bond Dickinson (US) LLP

(57) ABSTRACT

Systems and methods for initiating an interactive tutorial session within a first executing application via an interaction within a second executing application are disclosed. In one embodiment, a method comprises receiving an indication of a selection of a graphical user interface (GUI) element within a first executing application to receive direction as to performing a function associated with a second executing application; selecting, by the second executing application, an interactive tutorial session based on a parameter associated with the GUI element; and triggering, by the second executing application, an instance of the interactive tutorial session within a user interface of the second executing application.

14 Claims, 12 Drawing Sheets

FIG. 5A

SYSTEMS AND METHODS FOR TRIGGERING AN INTERACTIVE LEARNING CONTEXT VIA DEEP LINKING

FIELD OF THE INVENTION

Embodiments described herein relate to computer systems; more particularly, embodiments described herein relate to initiating an interactive tutorial session for an executing application via another executing application.

BACKGROUND

When attempting to learn how to use certain features or perform certain functions within a software application executing on a computing device, users may typically open a browser application, perform a web search, and visit one or more websites to find guidance in the form of step-by-step tutorials, videos, and/or the like. However, in instances in which performing the certain function involves numerous steps to complete, the user may be forced to toggle between the browser application and the software application in order to learn and perform each step, which disrupts user experience and negatively impacts computational resources of the computing device.

SUMMARY

Systems and methods for initiating a seamless, interactive tutorial session within a first executing application via an interaction within a second executing application are disclosed. In one embodiment, a method includes receiving an indication of a selection of a graphical user interface (GUI) element within a first executing application to receive direction as to performing a function associated with a second executing application. The method also includes selecting, by the second executing application, an interactive tutorial session based on a parameter associated with the GUI element. The method also includes triggering, by the second executing application, an instance of the interactive tutorial session within a user interface of the second executing application.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 5A illustrates an example user interface used in some example embodiments described herein.

DETAILED DESCRIPTION

Figure 1A:
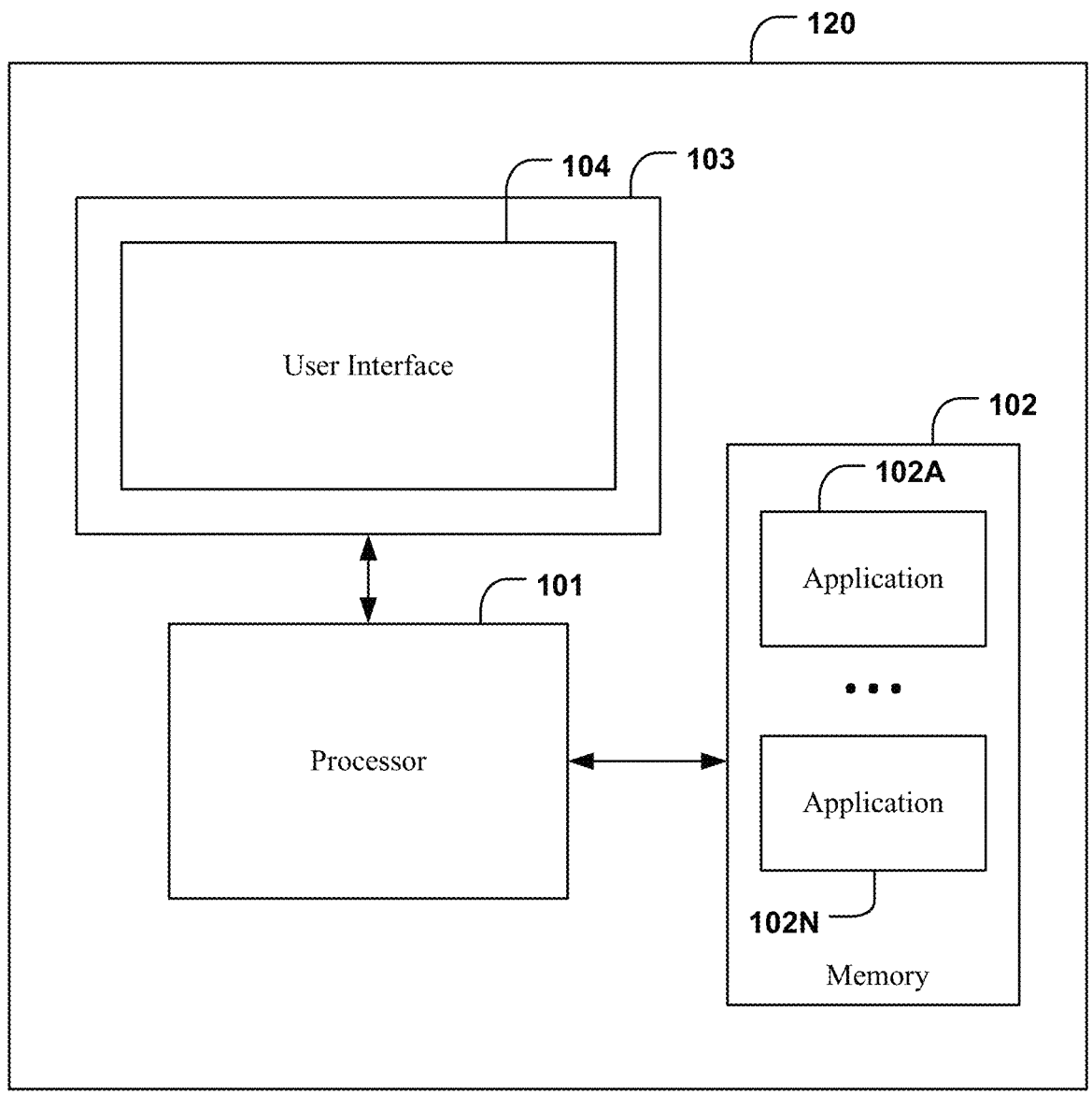
FIG. 1A is a block diagram of a user device or other computer system.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Embodiments of the present invention are directed to systems and methods for initiating an interactive tutorial session within a first executing application via an interaction within a second executing application. As mentioned above, if a user is unsure of how to perform a certain function within a software application, the user may exit or minimize the application and research the function in a web browser application. In this regard, the user may perform a web search via a search engine and access one or multiple websites in order to find an answer to their query, often in the form of step-by-step text instructions or video. The user may then re-open the software application and attempt to perform the function from memory, or switch back and forth between the software application and web browser application when the function involves numerous and/or detailed steps (thus unnecessarily increasing memory and central processing unit (CPU) usage and disrupting the user's workflow). The user may also create a split screen to view both the web browser application and the software application simultaneously, however this arrangement compromises valuable screen space of the software application, especially if the software application is a graphic design application (e.g., a vector graphics application or the like) in which maximum canvas size is preferred.

In contrast to these conventional techniques, example embodiments described herein provide a seamless and interactive learning experience which avoids continuous toggling between applications and/or the need to memorize instructions while maintaining all possible canvas or screen space for the software application. In some embodiments, an interactive tutorial session which directs a user on how to perform a function within a software application is triggered via a selection of a graphical user interface (GUI) element within a different software application. For example, if a user conducts a web search in a web browser for information on how to perform a certain function within a software application, the user may select a GUI element and be automatically re-directed into the software application, wherein an instance of an interactive tutorial session is triggered. The interactive tutorial session may then guide the user in perform the function directly in the software application and analyze inputs from the user to ensure the user is performing the function correctly. The interactive tutorial session provides immediate feedback as to whether the user successfully performed the desired function. These enhanced user interface capabilities allow for the user to have a seamless experience in learning a particular function of a software application without the need to toggle between applications and/or memorize instructions.

It is to be appreciated that while reference is made herein to vector graphics applications, the techniques described herein are not limited to vector graphics applications and may be applicable for use with other various types of software applications which may benefit from interactive tutorial sessions. Having briefly described an overview of the present invention, embodiments of the invention will be discussed with reference to FIGS. 1-6.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Having briefly described embodiments of the present invention, an exemplary operating environment suitable for use in implementing embodiments of the present invention is described below.

Referring to the drawings in general, and initially to FIG. 1A, which is a block diagram of a user device, such as a tablet, mobile phone, or other computer system. Referring to FIG. 1A, user device 120 comprises a processor 101 coupled to a memory 102 and a touch-surface display screen 103. Touch-surface display screen 103 displays a user interface 104. Memory 102 stores, among other data, one or more software applications (e.g., applications 102A-102N) which may be executed via the processor 101. For example, the applications 102A-102N may include a vector graphics application (or other graphics application) program 102A and a web browser application 102N. Processor 101 performs vector graphics operations on images displayed in a touch surface by touch-surface display screen 103 by executing the vector graphics application program 102A. In one embodiment, the vector graphics application 102A performs vector graphics operations on one or more images displayed in user interface 104 on touch-surface display screen 103. As mentioned above, and discussed in more detail below, the vector graphics application 102A, when executed by processor 101, provides a number of user interface tools that enable a user to perform vector graphics application operations in a tablet or other mobile device environment, as well as instantiate interactive tutorial sessions to aid a user in learning how to perform various functions within the vector graphics application 102A.

Figure 1B:
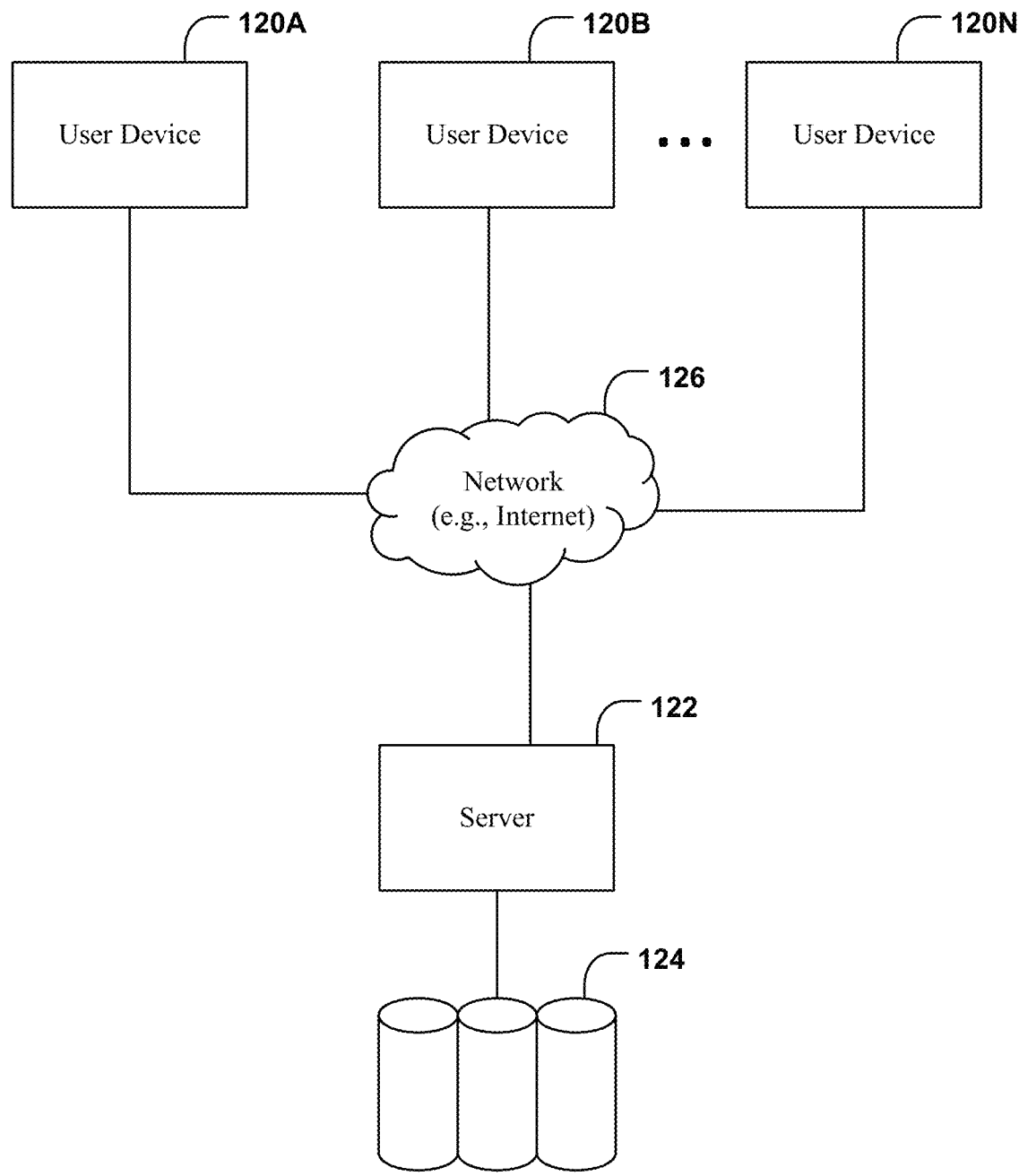
FIG. 1B illustrates a computing system environment.

FIG. 1B illustrates an example computing system environment, with which embodiments of the present invention may be implemented is illustrated. It will be understood and appreciated by those of ordinary skill in the art that the illustrated computing system environment is merely an example of one suitable computing environment and is not intended to suggest any limitation as to the scope of use or functionality of the invention. Neither should the example computing system environment be interpreted as having any dependency or requirement relating to any single component or combination of components illustrated therein.

In one embodiment, the computer system environment includes one or more user devices (e.g., user devices 120A, 120B, through 120N), such as tablets or other mobile computing devices, as shown above in FIG. 1A. In some embodiments, each user device 120A-N may operate in a computer network 126 using logical connections to a server 122. Exemplary computer networks 126 may include, without limitation, local area networks (LANs) and/or wide area networks (WANs). Such networking environments are commonplace in offices, enterprise-wide computer networks, intranets, and the Internet. When utilized in a WAN networking environment, the control server 122 may include a modem or other means for establishing communications over the WAN, such as the Internet. In a networked environment, program modules or portions thereof may be stored in association with a server 122, the database cluster 124, or any of user devices 120A-N. For example, and not by way of limitation, various application programs may reside on the memory associated with any one or more of user devices 120A-N. It will be appreciated by those of ordinary skill in the art that the network connections shown are exemplary and other means of establishing a communications link between the computers (e.g., server 122 and user devices 120A-N) may be utilized.

With continued reference to FIG. 1B, the example computing system environment includes a server 122. Components of server 122 may include, without limitation, a processing unit, internal system memory, and a suitable system bus for coupling various system components, including database cluster 124, with server 122. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

Server 122 typically includes therein, or has access to, a variety of computer-readable media, for instance, database cluster 124. Computer-readable media can be any available media that may be accessed by server 122, and includes volatile and nonvolatile media, as well as removable and non-removable media. By way of example, and not limitation, computer-readable media may include computer storage media. Computer storage media may include, without limitation, volatile and nonvolatile media, as well as removable and non-removable media implemented in any method or technology for storage of information, such as computer-readable instructions, data structures, program modules, or other data. In this regard, computer storage media may include, but is not limited to, RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by server 122. By way of example, and not limitation, communication media includes wired media such as a wired network or direct-wired connection, and wireless media such as acoustic, RF, infrared, and other wireless media. Combinations of any of the above also may be included within the scope of computer-readable media.

The computer storage media discussed above and illustrated in FIG. 1B, including database cluster 124, provide storage of computer-readable instructions, data structures, program modules, and other data for server 122.

Figure 2:
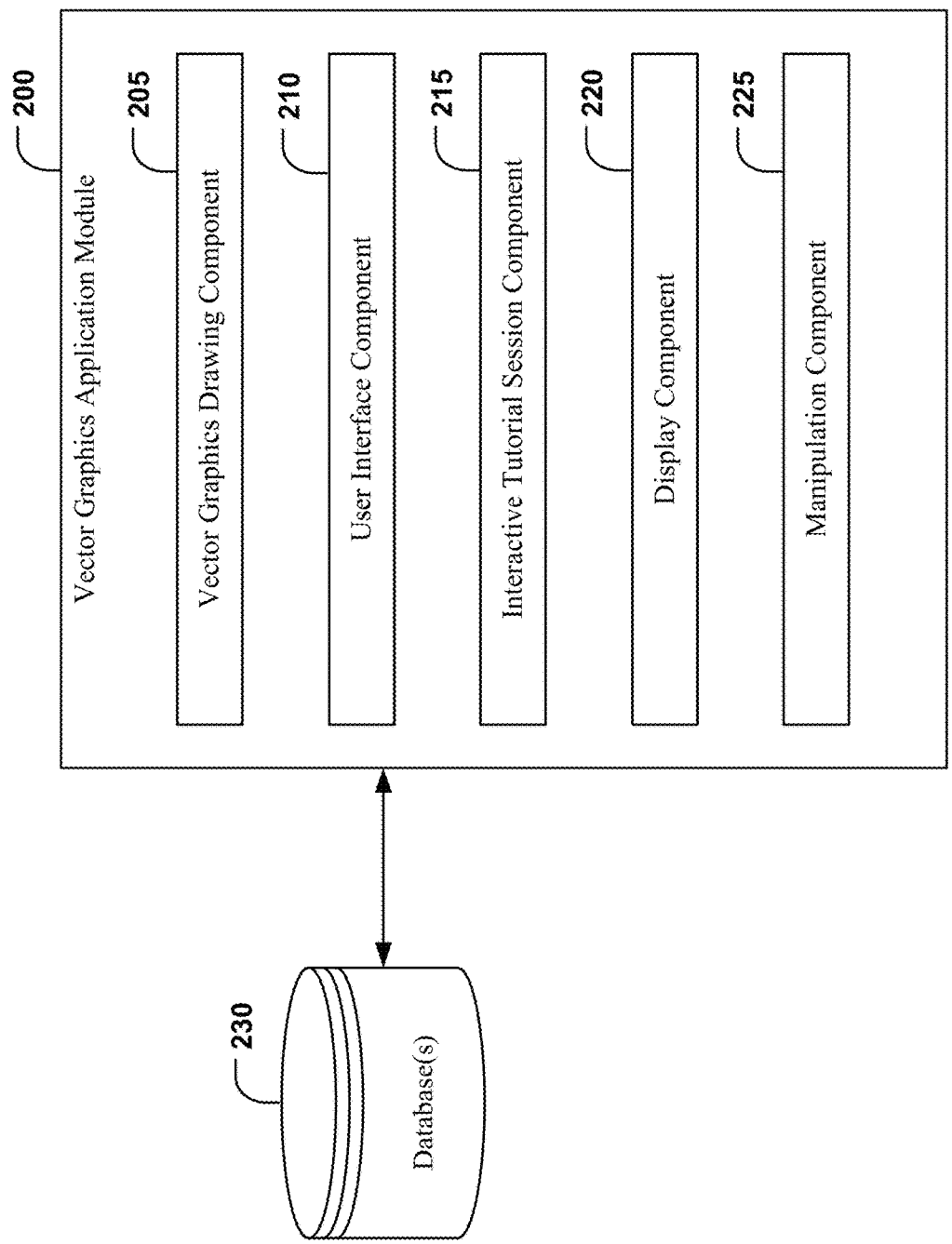
FIG. 2 is a block diagram showing one embodiment of a computing system architecture for an example vector graphics application.

With reference to FIG. 2, a block diagram is illustrated that shows an example of a computing system architecture for performing operations with a graphics application, such as vector graphics application 102A executing on a tablet (e.g., iPad) or other user device. It will be appreciated that the computing system architecture shown in FIG. 2 is merely an example of one suitable computing system and is not intended as having any dependency or requirement related to any single module/component or combination of modules/components.

In one embodiment, the vector graphics application module 200 includes a vector graphics drawing component 205 to perform vector graphics operations for the vector graphics application module 200 using information from one or more databases 230 (or other memories).

In one embodiment, the vector graphics application module 200 includes user interface component 210 for generating user interface elements through which a user is able to access and use features and functions of the vector graphics application module 200. The vector graphics application module 200 also includes an interactive tutorial session component 215 for performing operations related to an interactive tutorial session, such as instantiating an interactive tutorial session, displaying an interactive tutorial layer, displaying one or more tutorial prompts associated with the interactive tutorial session, and/or other related operations.

Display component 220 includes a graphical display device that may be a touch surface display screen, a monitor, computer screen, project device or other hardware device for displaying graphical user interfaces containing images and other data from artwork. In one embodiment, display component 220 displays the GUI with the list of selectable user interface elements with which a user of the display component interacts and employs.

In one embodiment, a manipulation component 225 allows a user to manipulate a touch surface display. For example, a user may desire to interact with touch surface display to vector graphics on a canvas, select or interact with various GUI elements of the vector graphics application, vectorize an image that is displayed in a user interface of the vector graphics application, move drawing elements displayed in a user interface of the vector graphics application, and/or the like.

The components described above enable a tablet or other user device to execute a vector graphics application having various user interface capacities.

Figure 3:
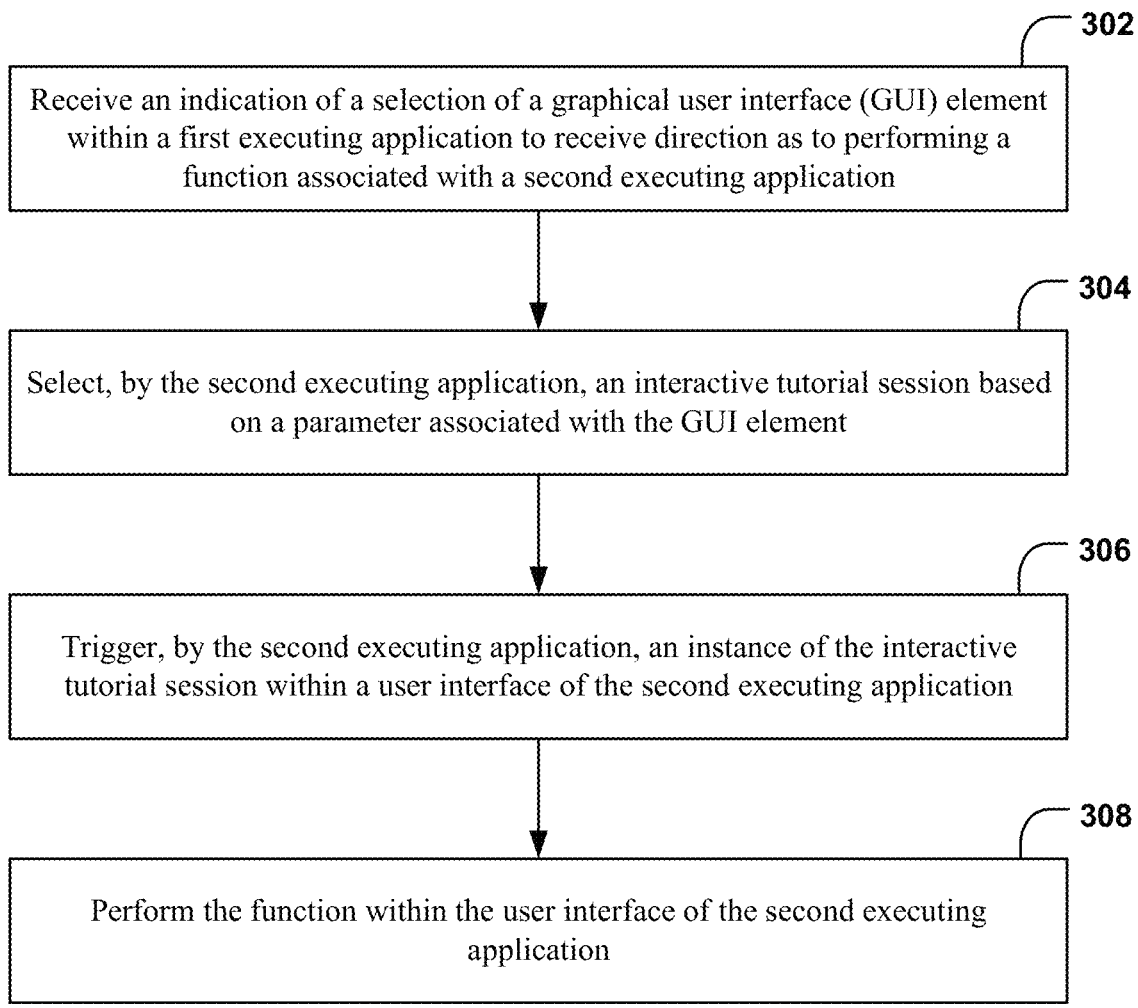
FIG. 3 is a flow diagram for triggering an interactive tutorial session within a first executing application via an interaction within a second executing application, in accordance with some example embodiments described herein.

FIG. 3 is a flow diagram of one embodiment of a process for triggering an interactive tutorial session within a first executing application via an interaction within a second executing application. The process is performed by processing logic that may comprise hardware (circuitry, dedicated logic, etc.), software (such as is run on a general-purpose computer system or a dedicated machine), firmware or a combination of the three. In one embodiment, the process is performed on a tablet executing a vector graphics application.

As shown in FIG. 3, the process begins by receiving an indication of a graphical user interface (GUI) element within a first executing application to receive direction as to performing a function associated with a second executing application (processing block 302). To provide example context, a user may be in the process of creating a vector graphics artwork via an executing vector graphics application 102A on their user device (e.g., a tablet) and desire to learn how to perform a function within the vector graphics application. The user may open a web browser application 102N on their tablet and perform a web search related to the specific function. In doing so, the user may navigate to one or more websites provided in search results to their query in order to find relevant information.

In one example, the user may navigate to a website that is associated with the particular vector graphics application. For example, an organization that develops and/or maintains the vector graphics application may host an instructional website that includes various tutorials and/or general resources regarding the vector graphics application which users may access.

Figure 5A:
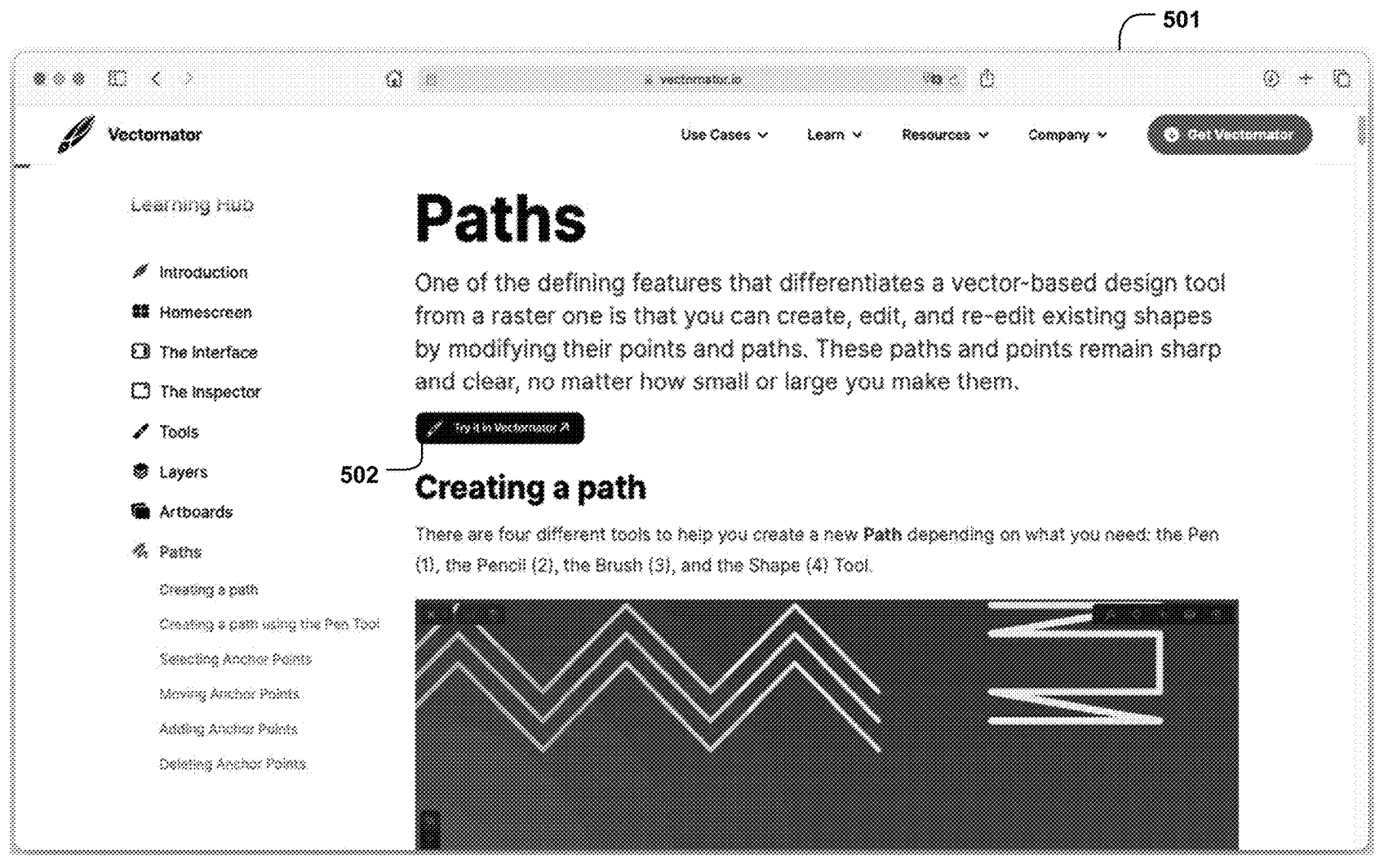

Turning briefly to FIG. 5A, an example representation of an executing web browser application 501 displaying such a website is shown. In the particular example shown in FIG. 5A, a user may have searched for information on how to create a curved path in the vector graphics application and accessed the website shown in FIG. 5A via the search results. As shown, the website contains a GUI element 502 which the user may select. The GUI element 502 may include text suggesting that the user select the GUI element 502 to launch an interactive tutorial session with the vector graphics application.

In some embodiments, the GUI element may be a deep link. A deep link is an instruction specifying a particular environment instance of an application (e.g., a native application) and is configured to cause the native application to instantiate the environment instance of the specified native application when selected at a user device. The deep link may include a uniform resource indicator (URI) that specifies a particular native application and a parameter that indicates a specific interactive tutorial session that the native application is to access and instantiate when the native application is launched by selection of the deep link. Said differently, user selection of the deep link in the browser application may cause the use device to switch from presenting the browser application to presenting the vector graphics application, and an interactive tutorial session (as indicated by the parameter) may be instantiated within the vector graphics application.

Figure 5B:
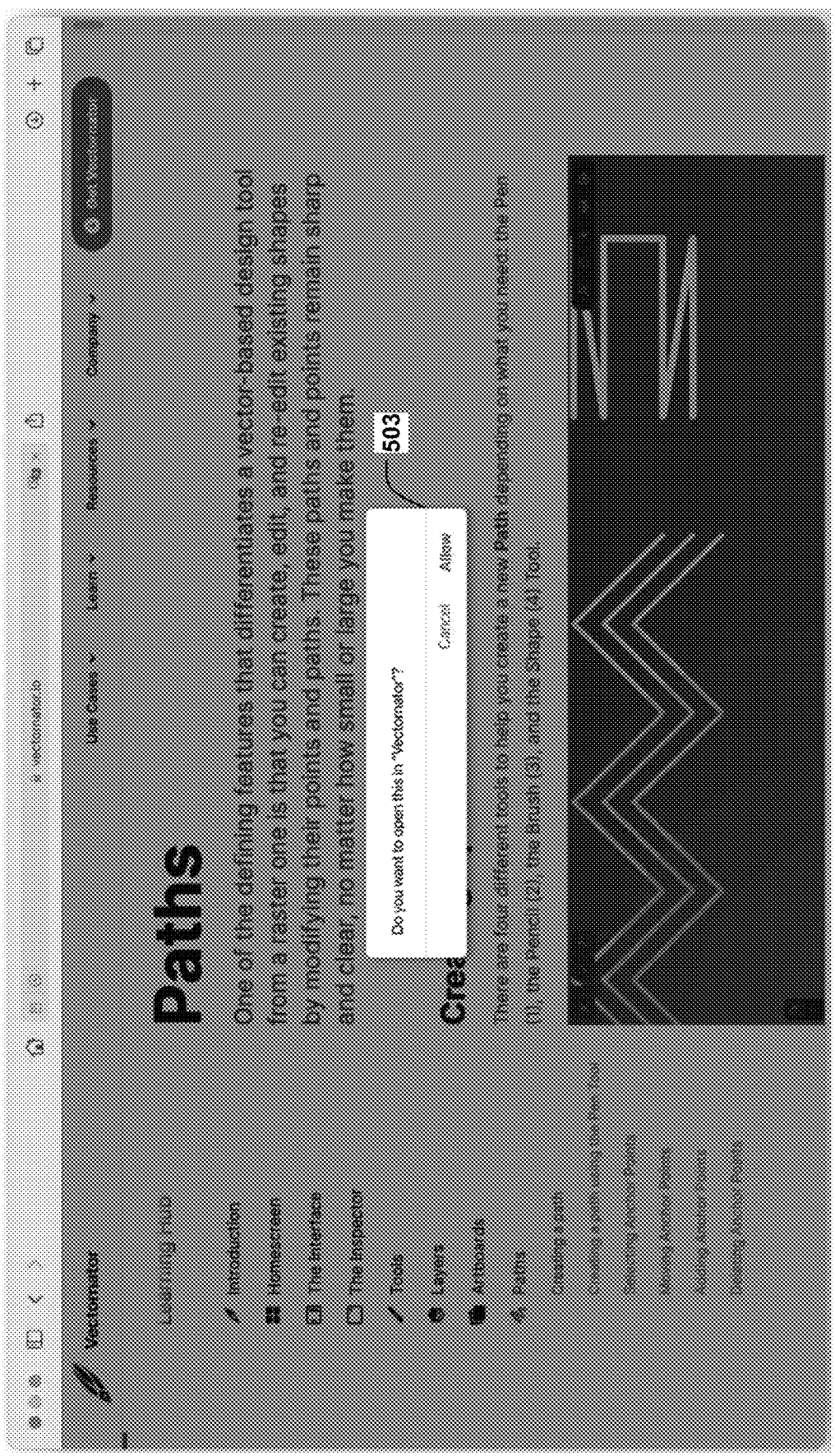
FIG. 5B illustrates an example user interface used in some example embodiments described herein.
Figure 5C:
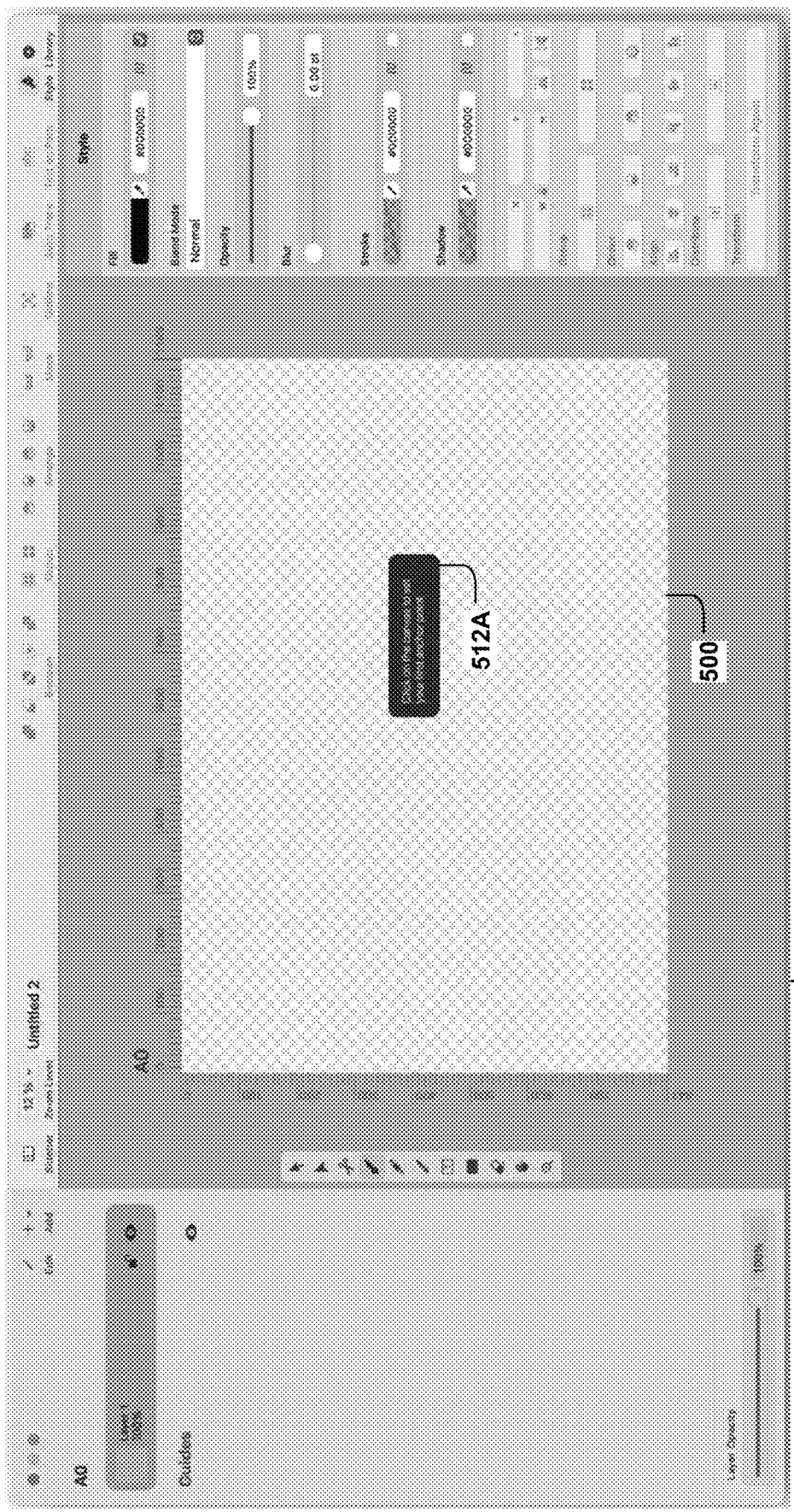
FIG. 5C illustrates an example user interface used in some example embodiments described herein.

In some embodiments, as shown in FIG. 5B, a prompt 503 may be shown after selection of the GUI element 502 to confirm that the user does indeed want to switch from the browser application to the vector graphics application. As shown, the user may select to either proceed to the vector graphics application or cancel the operation.

Returning to FIG. 4, the process continues by selecting, by the second executing application, an interactive tutorial session based on a parameter associated with the GUI element (processing block 304). For example, the parameter may comprise an identifier, such as a link or pointer, which identifies a tutorial file (e.g., program instructions) which, when selected and executed, trigger an instance of the interactive tutorial session within the vector graphics application. In this regard, in some embodiments, the vector graphics application 102A stored in memory on the user device may comprise a plurality of tutorial files from which to select. Alternatively, the plurality of tutorial files may be hosted remotely, such as on server 122. Regardless of how the plurality of tutorial files are stored, an interactive tutorial session may be selected by selecting a tutorial file from the plurality of tutorial files based on the tutorial file which the parameter indicates.

The process then continues by triggering, by the second executing application, an instance of the interactive tutorial session within a user interface of the second executing application (processing block 306). As mentioned above, in response to the user selecting the deep link from within the web browser application, the user device switches from the web browser application to the vector graphics application and an interactive tutorial session is triggered. In some embodiments, triggering the instance of the interactive tutorial session includes displaying, by the second executing application, an interactive tutorial layer superimposed on the user interface of the second executing application. The interactive tutorial layer may display one or a series of tutorial prompts which instruct the user to perform one or a series of tasks in order to learn how to perform the function they were seeking help online for. In this regard, the process continues by performing the function within the user interface of the second executing application in connection with the interactive tutorial layer (processing block 308).

In some embodiments, the user interface may comprise an artboard (e.g., a canvas) which contains an in-progress vector graphics project which the user was creating. In this regard, the interactive tutorial layer may be superimposed over the in-progress vector graphics project, allowing the user to learn how to perform the particular function within the in-progress vector graphics project and without interruption to the in-progress vector graphics project. In some embodiments, any changes made to the in-progress vector graphics project during the interactive tutorial session may be maintained after the interactive tutorial session is terminated. For example, a curved path generated by the user during an interactive tutorial session instructing the user on how to create a curved path may be maintained such that it becomes a part of the in-progress vector graphics project once the interactive tutorial session is complete. In some other embodiments, any changes made to the in-progress vector graphics project during the interactive tutorial session may be automatically removed after the interactive tutorial session is terminated in order to avoid any potentially unwanted changes to the in-progress vector graphics project. While engaging with an interactive tutorial session within an in-progress vector graphics project may be acceptable in certain circumstances, the user may instead desire to engage with the interactive tutorial session in a new file (e.g., on a blank artboard) to avoid accidentally altering their current artwork. In this regard, the vector graphics application may comprise a setting which users can toggle to automatically generate a new vector graphics project (having a blank artboard) when launching an interactive tutorial session via a deep link. Said differently, initiating the instance of the interactive tutorial session may include generating the new vector graphics project. The new vector graphics project may be opened in addition to the in-progress vector graphics project, such that the user can easily switch back to the in-progress vector graphics project once the user learns how to perform the function within the interactive tutorial session in the new vector graphics project.

Examples of the superimposed interactive tutorial layer and its tutorial prompts are shown in FIGS. 5C-5F and further described below in connection with FIG. 4.

Figure 4:
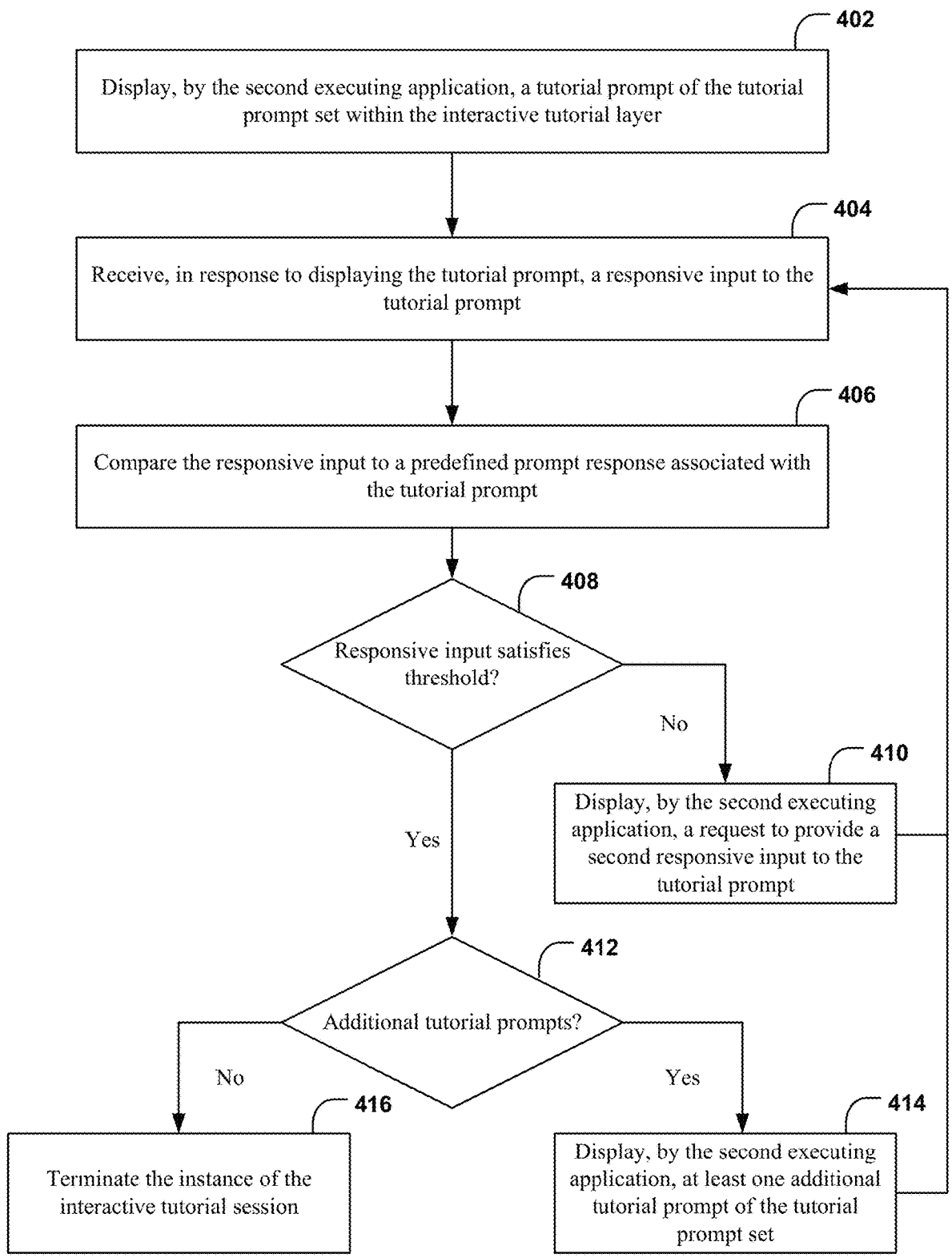
FIG. 4 is a flow diagram for performing a function in connection with an interactive tutorial layer, in accordance with some example embodiments described herein.

FIG. 4 is a flow diagram for performing a function in connection with an interactive tutorial layer. The process is performed by processing logic that may comprise hardware (circuitry, dedicated logic, etc.), software (such as is run on a general-purpose computer system or a dedicated machine), firmware or a combination of the three. In one embodiment, the process is performed on a tablet executing a vector graphics application.

As shown in FIG. 4, the process begins by displaying, by the second executing application, a tutorial prompt of the tutorial prompt set within the interactive tutorial layer (processing block 402).

Turning briefly to FIG. 5A, an example representation of a user interface of an executing vector graphics application 511 displaying an artboard 500 is shown. The artboard 500 is a user interface for displaying vector graphics artwork of a user under control of the vector graphics application executing on the tablet (or other user device). In the particular example shown in FIG. 5C, an interactive tutorial session has been triggered (via selection of the GUI element 502 shown in FIG. 5A) and a tutorial prompt 512A is displayed (superimposed over the artboard in an interactive tutorial layer). The particular example interactive tutorial session shown in FIGS. 5C-5F is a tutorial on how to create a curve path (e.g., a curved line) on the artboard. The tutorial prompt 512A instructs the user on how to complete the first step in creating a curve path (e.g., "click on the canvas to set your first anchor point").

In response to tutorial prompt 512A, the user may attempt to perform the task as instructed. In this regard, the process of FIG. 4 may continue by receiving, in response to displaying the tutorial prompt, a responsive input to the tutorial prompt (processing block 404). The responsive input may comprise an event or action by the user. For example, the responsive input to tutorial prompt 512A may include the user clicking on the artboard (e.g., via touching the touch-surface display screen 103, clicking on the artboard via a mouse, and/or the like).

Once received, the responsive input may be compared to a predefined prompt response associated with the tutorial prompt (processing block 406). In this regard, the interactive tutorial session may have one or more predefined prompt responses for each tutorial prompt. In some embodiments, the responsive input may be compared to the predefined prompt response to determine based on the comparison, whether the responsive input satisfies a threshold associated with the predefined prompt response (decision block 408). In one example, a similarity score (e.g., a value between 0 and 1) for the responsive input and the predefined prompt response may be calculated and the similarity score may be compared with a threshold (e.g., a value). For example, if the similarity score is greater than or equal 0.90, it may be determined that the responsive input satisfies the threshold, and if the similarity score is below 0.90, it may be determined that the responsive input does not satisfy the threshold. It is to be appreciated that other methods of comparison may be employed to determine if the event of the responsive input matches or is otherwise similar to the predefined prompt response.

In an instance in which the responsive input fails to satisfy the threshold, the process continues by displaying, by the second executing application, a request to provide a second responsive input to the tutorial prompt (processing block 410). For example, the request may be displayed as updated text within the tutorial prompt 512A, which provides some indication to the user that they performed the task incorrectly. In some embodiments, the tutorial prompt 512A may flash or change color to indicate that the first responsive input was unsuccessful.

In an instance in which the responsive input satisfies the threshold, the process continues by determining whether successful responsive inputs have been received for each tutorial prompt in the tutorial prompt set (decision block 412). For instance, if there are no additional tutorial prompts that follow tutorial prompt 512A, the instance of the interactive tutorial session may be terminated (processing block 416). If there are additional tutorial prompts that follow tutorial prompt 512A, the process may continue by displaying, by the second executing application, at least one additional tutorial prompt of the tutorial prompt set (processing block 414).

Figure 5D:
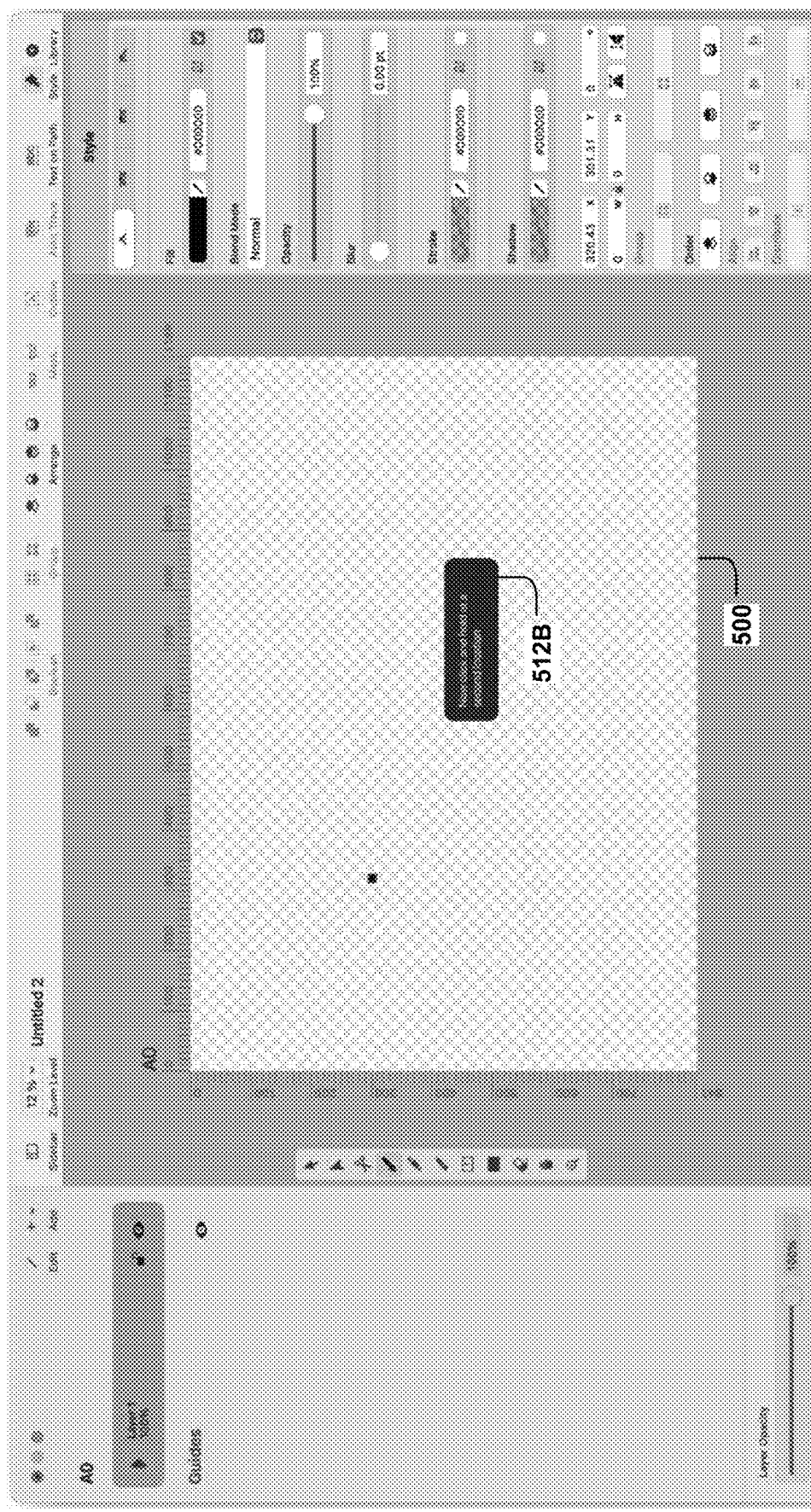
FIG. 5D illustrates an example user interface used in some example embodiments described herein.
Figure 5E:
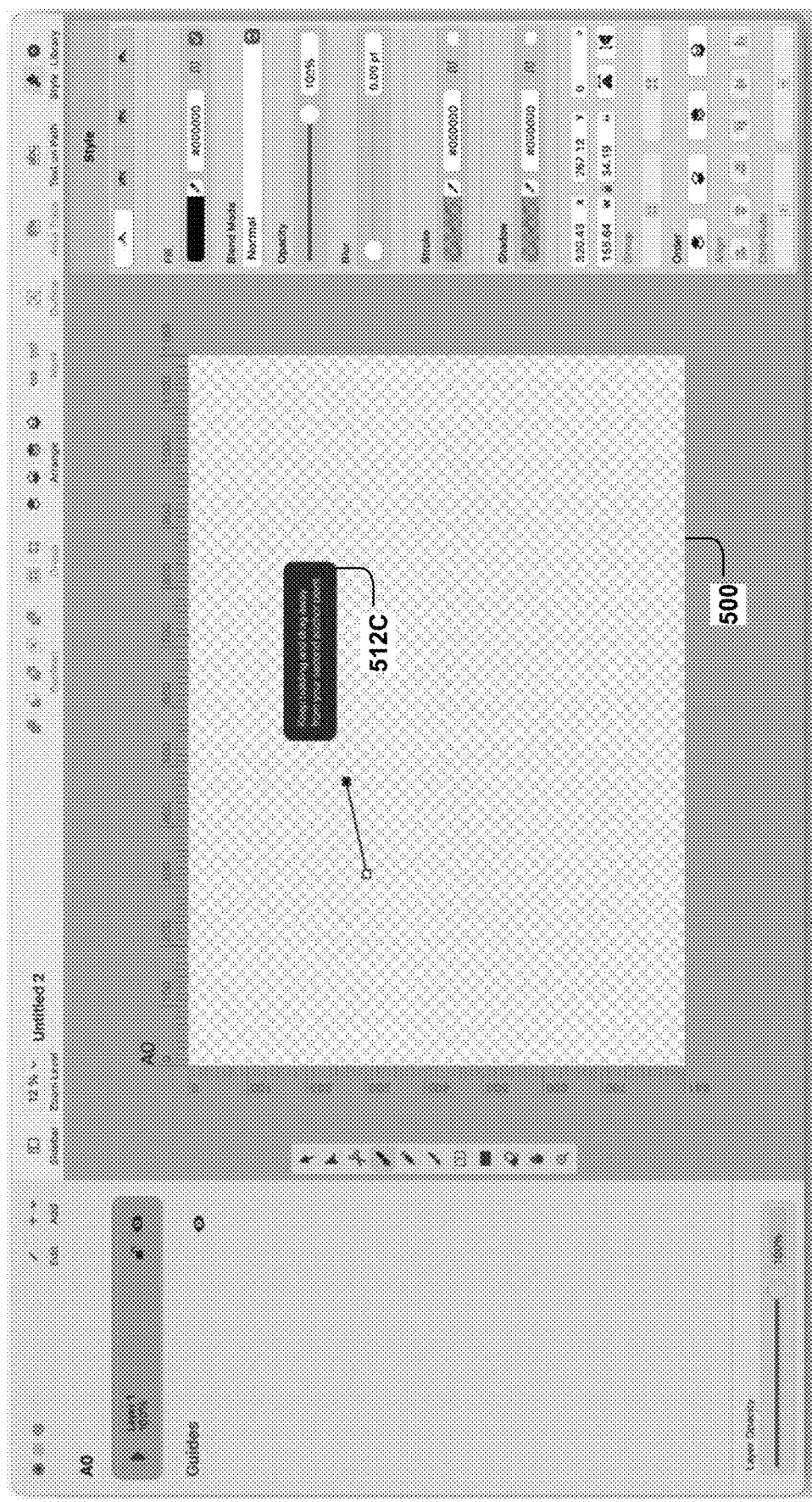
FIG. 5E illustrates an example user interface used in some example embodiments described herein.
Figure 5F:
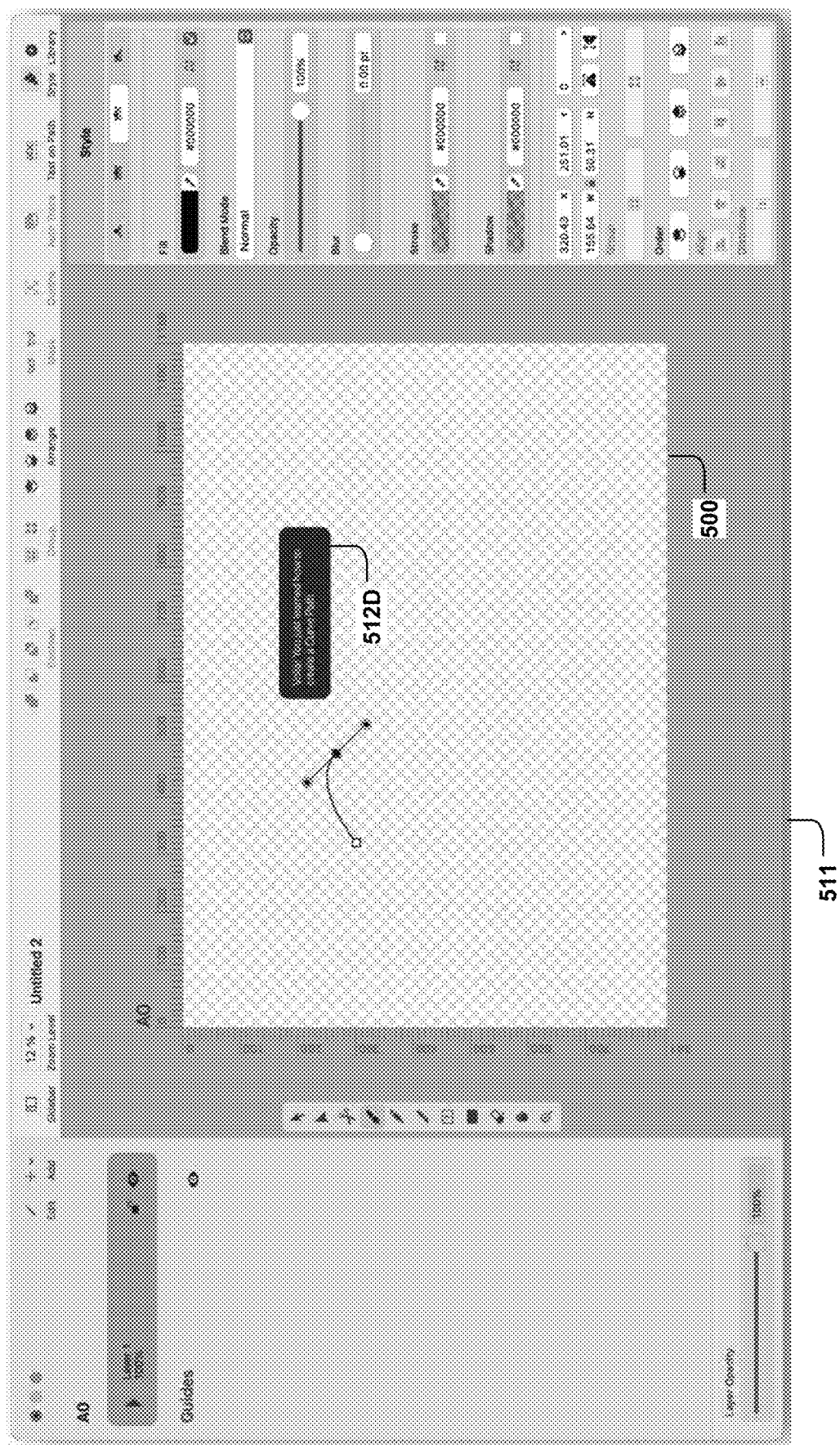
FIG. 5F illustrates an example user interface used in some example embodiments described herein.

Turning to FIG. 5D, a second tutorial prompt 512B is displayed in response to providing a successful responsive input to the first tutorial prompt 512A. As shown, the second tutorial prompt 512B instructs the user to "click and hold at a second location" in order to continue performing the function of creating a curve path. In response to a successful responsive input to the second tutorial prompt 512B, a third tutorial prompt 512C may be displayed, as shown in FIG. 5E, which instructs the user as to the next task in performing the function of creating a curve path. In response to a successful responsive input to the third tutorial prompt 512C, a final tutorial prompt 512D may be displayed, as shown in FIG. 5F. The final tutorial prompt 512D provides an indication that the user has successfully performed the function of creating a curve path. The interactive tutorial session may then terminate, and the user may return to an in-progress vector graphics project having learned how to perform the function.

Figure 6:
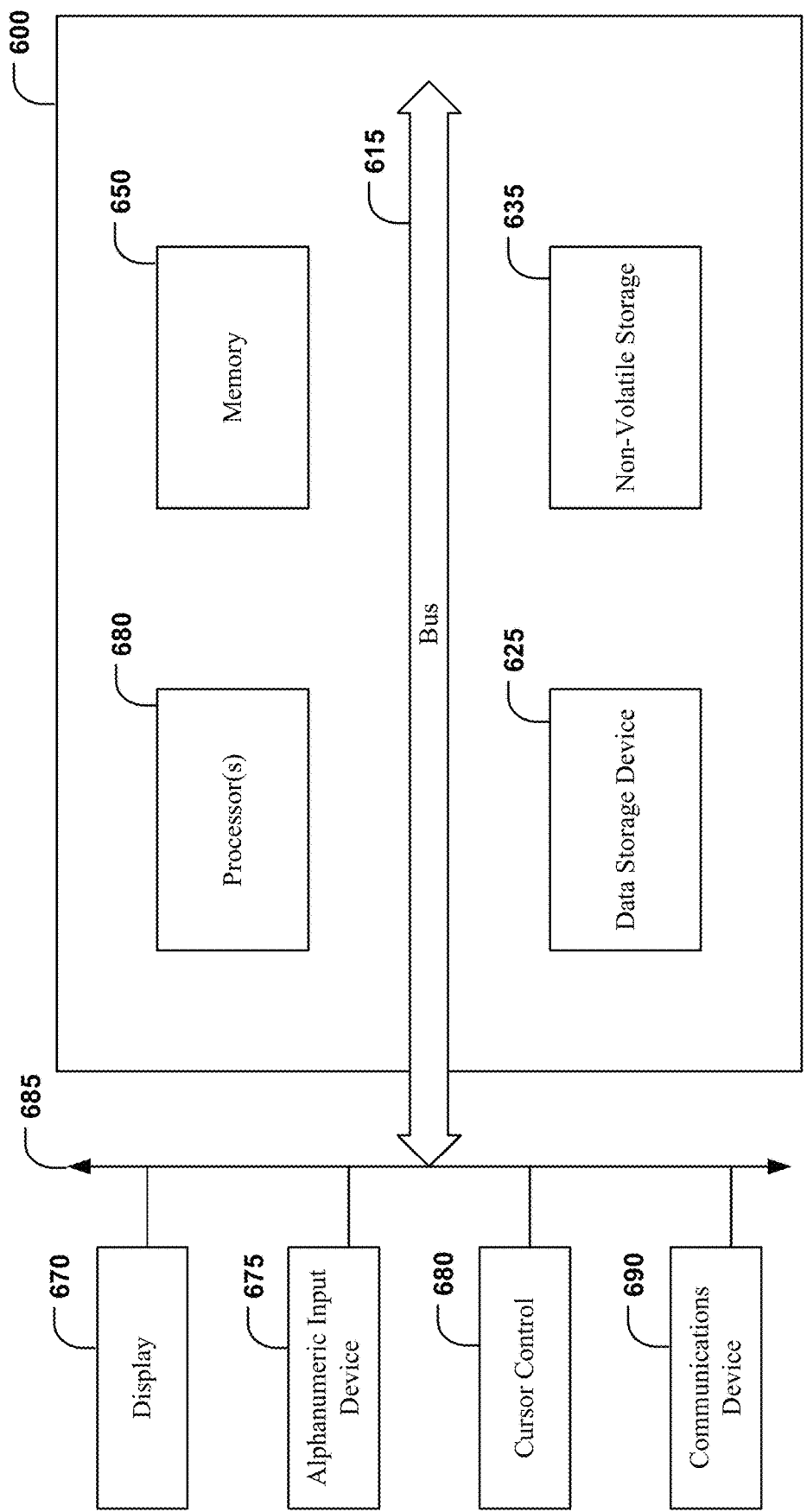
FIG. 6 illustrates an example computer system that may be used to support the systems and operations discussed herein.

FIG. 6 illustrates one embodiment of an example computer system 600 that may be used to support the systems and operations discussed herein. In one embodiment, the computer system is a tablet or other mobile computer system, such as a mobile phone and/or the like. It will be apparent to those of ordinary skill in the art, however, that other alternative systems of various system architectures may also be used.

The computer system 600 illustrated in FIG. 6 includes a bus 615 or other internal communication means for communicating information, and a processor 680 (or multiple processors) coupled to the bus 615 for processing information. The computer system 1700 further comprises a random-access memory (RAM) or other volatile storage device 650 (referred to as memory), coupled to bus 615 for storing information and instructions to be executed by processor 680. Memory 650 also may be used for storing temporary variables or other intermediate information during execution of instructions by processor 680. The computer system 600 may also comprise a read-only memory (ROM) and/or static non-volatile storage device 635 coupled to bus 615 for storing static information and instructions for processor 680, and a data storage device 625 such as a magnetic disk or optical disk and its corresponding disk drive. Data storage device 625 is coupled to bus 615 for storing information and instructions.

The computer system 600 may further be coupled to a display device 670, such as a touch surface display, a light emitting diode (LED) display or a liquid crystal display (LCD) coupled to bus 615 through bus 685 for displaying information to a computer user. An alphanumeric input device 675, including alphanumeric and other keys, may also be coupled to bus 615 through bus 685 for communicating information and command selections to processor 680. An additional user input device is cursor control device 680, such as a touchpad, mouse, a trackball, stylus, or cursor direction keys coupled to bus 615 through bus 685 for communicating direction information and command selections to processor 680, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

In one embodiment, processor 680 executes instructions to perform any of the operations described above including the components and modules described in relation to FIG. 2 as well as the functions related to displaying and performing operations described above in connection with FIGS. 3-5F.

It will be appreciated by those of ordinary skill in the art that any configuration of the system may be used for various purposes according to the particular implementation. The control logic or software implementing the described embodiments can be stored in memory 650, data storage device 625, or other storage medium locally or remotely accessible to processor 680.

It will be apparent to those of ordinary skill in the art that the systems and methods described herein can be implemented as software stored in memory 650 and executed by processor 680. This control logic or software may also be resident on an article of manufacture comprising a computer readable medium having computer readable program code embodied therein and being readable by the storage device 625 and for causing the processor 680 to operate in accordance with the methods and teachings herein.

The embodiments discussed herein may also be embodied in a handheld or portable device containing a subset of the computer hardware components described above. For example, the handheld device may be configured to contain only the bus 685, the processor 680, and memory 650 and/or data storage device 1725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 680, a data storage device 625, a bus 615, and memory 650, and only rudimentary communications mechanisms, such as a small touch-screen that permits the user to communicate in a basic manner with the device. In general, the more special-purpose the device is, the fewer of the elements need to be present for the device to function.

There are a number of example embodiments described herein.

Example 1 is a method comprising: receiving an indication of a selection of a graphical user interface (GUI) element within a first executing application to receive direction as to performing a function associated with a second executing application; selecting, by the second executing application, an interactive tutorial session based on a parameter associated with the GUI element; and triggering, by the second executing application, an instance of the interactive tutorial session within a user interface of the second executing application.

Example 2 is the method of example 1 that may optionally include that triggering the instance of the interactive tutorial session comprises displaying, by the second executing application, an interactive tutorial layer superimposed on the user interface of the second executing application, and that the interactive tutorial layer comprises a tutorial prompt set, and the method further comprises performing the function within the user interface of the second executing application in connection with the interactive tutorial layer.

Example 3 is the method of example 2, that may optionally include that performing the function comprises: displaying, by the second executing application, a first tutorial prompt of the tutorial prompt set within the interactive tutorial layer; receiving, in response to displaying the first tutorial prompt, a responsive input to the first tutorial prompt; comparing the responsive input to a predefined prompt response associated with the first tutorial prompt; and determining, based on the comparison, whether the responsive input satisfies a threshold associated with the predefined prompt response.

Example 4 is the method of example 3 that may optionally include, in an instance in which the responsive input satisfies the threshold: displaying, by the second executing application, at least one additional tutorial prompt of the tutorial prompt set.

Example 5 is the method of example 4, that may optionally include terminating the instance of the interactive tutorial session in response to determining that successful responsive inputs have been received for each tutorial prompt in the tutorial prompt set.

Example 6 is the method of example 3 that may optionally include, in an instance in which the responsive input fails to satisfy the threshold: displaying, by the second executing application, a request to provide a second responsive input to the first tutorial prompt.

Example 7 is the method of example 1 that may optionally include that the GUI element comprises a deep link.

Example 8 is the method of example 1 that may optionally include that the first executing application comprises a web browser.

Example 9 is the method of example 8 that may optionally include that the GUI element is associated with an instructional web site for the second executing application.

Example 10 is the method of example 1 that may optionally include that the second executing application comprises a vector graphics application.

Example 11 is the method of example 10 that may optionally include that the user interface comprises an in-progress vector graphics project.

Example 12 is the method of example 10 that may optionally include that the user interface comprises a new vector graphics project.

Example 13 is the method of example 12 that may optionally include that initiating the instance of the interactive tutorial session comprises generating the new vector graphics project.

Example 14 is one or more non-transitory computer readable storage media having instructions stored thereupon which, when executed by a system having at least a processor and a memory therein, cause the system to perform operations comprising: receiving an indication of a selection of a graphical user interface (GUI) element within a first executing application; triggering, in response to receiving the indication, execution of a second application; selecting, by the second executing application, an interactive tutorial session based on a parameter associated with the GUI element; and initiating, by the second executing application, an instance of the interactive tutorial session within a user interface of the second executing application.

Example 15 is the non-transitory computer readable storage media of claim 14, that may optionally include that triggering the instance of the interactive tutorial session comprises displaying, by the second executing application, an interactive tutorial layer superimposed on the user interface of the second executing application, and that the interactive tutorial layer comprises a tutorial prompt set, and that the operations further comprise performing the function within the user interface of the second executing application in connection with the interactive tutorial layer.

Example 16 is the non-transitory computer readable storage media of claim 15, that may optionally include that performing the function comprises: displaying, by the second executing application, a first tutorial prompt of the tutorial prompt set within the interactive tutorial layer; receiving, in response to displaying the first tutorial prompt, a responsive input to the first tutorial prompt; comparing the responsive input to a predefined prompt response associated with the first tutorial prompt; and determining, based on the comparison, whether the responsive input satisfies a threshold associated with the predefined prompt response.

Example 17 is a system comprising: a touch-sensitive display surface; a memory; and one or more processors coupled to the memory and the touch-sensitive display surface, the one or more processors configured to: receive an indication of a selection of a graphical user interface (GUI) element within a first executing application; trigger, in response to receiving the indication, execution of a second application; select, by the second executing application, an interactive tutorial session based on a parameter associated with the GUI element; and initiate, by the second executing application, an instance of the interactive tutorial session within a user interface of the second executing application.

Example 18 is the system of claim 17 that may optionally include that triggering the instance of the interactive tutorial session comprises displaying, by the second executing application, an interactive tutorial layer superimposed on the user interface of the second executing application, and that the interactive tutorial layer comprises a tutorial prompt set, and that the one or more processors are further configured to perform the function within the user interface of the second executing application in connection with the interactive tutorial layer.

Example 19 is the system of claim 18 that may optionally include that performing the function comprises: displaying, by the second executing application, a first tutorial prompt of the tutorial prompt set within the interactive tutorial layer; receiving, in response to displaying the first tutorial prompt, a responsive input to the first tutorial prompt; comparing the responsive input to a predefined prompt response associated with the first tutorial prompt; and determining, based on the comparison, whether the responsive input satisfies a threshold associated with the predefined prompt response.

Example 20 is the system of claim 17 that may optionally include that the GUI element comprises a deep link.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A method comprising:
    receiving an indication of a selection of a graphical user interface (GUI) element within a first executing application to receive direction as to performing a function associated with a second executing application, wherein the second executing application comprises a vector graphics application;
    selecting, by the second executing application, an interactive tutorial session based on a parameter associated with the GUI element, wherein the parameter indicates a specific interactive tutorial session that the second executing application is to access and instantiate;
    triggering, by the second executing application, an instance of the interactive tutorial session within a user interface of the second executing application, wherein triggering the instance of the interactive tutorial session comprises displaying, by the second executing application, an interactive tutorial layer superimposed on the user interface of the second executing application, wherein the interactive tutorial layer comprises a tutorial prompt set; and
    performing the function within the user interface of the second executing application in connection with the interactive tutorial layer, wherein performing the function comprises:
        displaying, by the second executing application, a first tutorial prompt of the tutorial prompt set within the interactive tutorial layer, the first tutorial prompt comprising an instruction to set an anchor point, as part of creating a curve path;
        receiving, in response to displaying the first tutorial prompt, a first responsive input to the first tutorial prompt;
        calculating a first similarity score for the first responsive input and a first predefined prompt response;
        determining, based on the first similarity score, whether the first responsive input satisfies a first threshold associated with the first predefined prompt response;
        displaying, by the second executing application, a second tutorial prompt of the tutorial prompt set within the interactive tutorial layer, the second tutorial prompt comprising an instruction to drag a cursor away from the anchor point, as part of creating the curve path;
        receiving, in response to displaying the second tutorial prompt, a second responsive input to the second tutorial prompt;
        calculating a second similarity score for the second responsive input and a second predefined prompt response; and
        determining, based on the second similarity score, whether the second responsive input satisfies a second threshold associated with the second predefined prompt response.

2. The method of claim 1, further comprising, in an instance in which the first responsive input satisfies the first threshold:
    displaying, by the second executing application, at least one additional tutorial prompt of the tutorial prompt set.

3. The method of claim 2, further comprising:
    terminating the instance of the interactive tutorial session in response to determining that successful responsive inputs have been received for each tutorial prompt in the tutorial prompt set.

4. The method of claim 1, further comprising, in an instance in which the first responsive input fails to satisfy the first threshold:
    displaying, by the second executing application, a request to provide a fourth responsive input to the first tutorial prompt.

5. The method of claim 1, wherein the GUI element comprises a deep link.

6. The method of claim 1, wherein the first executing application comprises a web browser.

7. The method of claim 6, wherein the GUI element is associated with an instructional web site for the second executing application.

8. The method of claim 1, wherein the user interface comprises an in-progress vector graphics project.

9. The method of claim 1, wherein the user interface comprises a new vector graphics project.

10. The method of claim 9, wherein triggering the instance of the interactive tutorial session comprises generating the new vector graphics project.

11. A non-transitory computer readable storage media having instructions stored thereupon which, when executed by a system having at least a processor and a memory therein, cause the system to perform operations comprising:
    receiving an indication of a selection of a graphical user interface (GUI) element within a first executing application to receive direction as to performing a function associated with a second executing application, wherein the second executing application comprises a vector graphics application;
    selecting, by the second executing application, an interactive tutorial session based on a parameter associated with the GUI element, wherein the parameter indicates a specific interactive tutorial session that the second executing application is to access and instantiate;
    triggering, by the second executing application, an instance of the interactive tutorial session within a user interface of the second executing application, wherein triggering the instance of the interactive tutorial session comprises displaying, by the second executing application, an interactive tutorial layer superimposed on the user interface of the second executing application, wherein the interactive tutorial layer comprises a tutorial prompt set, and
    performing the function within the user interface of the second executing application in connection with the interactive tutorial layer, wherein performing the function comprises:
        displaying, by the second executing application, a first tutorial prompt of the tutorial prompt set within the interactive tutorial layer, the first tutorial prompt comprising an instruction to set an anchor point, as part of creating a curve path;
        receiving, in response to displaying the first tutorial prompt, a first responsive input to the first tutorial prompt;
        calculating a first similarity score for the first responsive input and a first predefined prompt response;
        determining, based on the first similarity score, whether the first responsive input satisfies a first threshold associated with the first predefined prompt response;
        displaying, by the second executing application, a second tutorial prompt of the tutorial prompt set within the interactive tutorial layer, the second tutorial prompt comprising an instruction to drag a cursor away from the anchor point, as part of creating the curve path;
        receiving, in response to displaying the second tutorial prompt, a second responsive input to the second tutorial prompt;
        calculating a second similarity score for the second responsive input and a second predefined prompt response; and
        determining, based on the second similarity score, whether the second responsive input satisfies a second threshold associated with the second predefined prompt response.

12. A system comprising:
    a touch-sensitive display surface;
    a memory; and
    one or more processors coupled to the memory and the touch-sensitive display surface, the one or more processors configured to:
    receive an indication of a selection of a graphical user interface (GUI) element within a first executing application to receive direction as to performing a function associated with a second executing application, wherein the second executing application comprises a vector graphics application;
    select, by the second executing application, an interactive tutorial session based on a parameter associated with the GUI element, wherein the parameter indicates a specific interactive tutorial session that the second executing application is to access and instantiate;
    trigger, by the second executing application, an instance of the interactive tutorial session within a user interface of the second executing application, wherein to trigger the instance of the interactive tutorial session is further to display, by the second executing application, an interactive tutorial layer superimposed on the user interface of the second executing application, wherein the interactive tutorial layer comprises a tutorial prompt set, and
    perform a function within the user interface of the second executing application in connection with the interactive tutorial layer, wherein to perform the function is further to:
        display, by the second executing application, a first tutorial prompt of the tutorial prompt set within the interactive tutorial layer, the first tutorial prompt comprising an instruction to set an anchor point, as part of creating a curve path;
        receive, in response to displaying the first tutorial prompt, a first responsive input to the first tutorial prompt;
        calculate a first similarity score for the first responsive input and a first predefined prompt response;
        determine, based on the first similarity score, whether the first responsive input satisfies a first threshold associated with the first predefined prompt response;
        display, by the second executing application, a second tutorial prompt of the tutorial prompt set within the interactive tutorial layer, the second tutorial prompt comprising an instruction to drag a cursor away from the anchor point, as part of creating the curve path;
        receive, in response to displaying the second tutorial prompt, a second responsive input to the second tutorial prompt;
        calculate a second similarity score for the second responsive input and a second predefined prompt response; and
        determine, based on the second similarity score, whether the second responsive input satisfies a second threshold associated with the second predefined prompt response.

13. The system of claim 12, wherein the GUI element comprises a deep link.

14. The method of claim 1, wherein the interactive tutorial session has a plurality of predefined prompt responses for the first tutorial prompt.

* * * * *